(12) United States Patent
Cariello et al.

(10) Patent No.: US 11,836,373 B2
(45) Date of Patent: Dec. 5, 2023

(54) MODIFIED ERASE

(71) Applicant: Micron Technology, Inc., Boise, ID (US)

(72) Inventors: Giuseppe Cariello, Boise, ID (US); Fulvio Rori, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 10 days.

(21) Appl. No.: 17/166,855

(22) Filed: Feb. 3, 2021

(65) Prior Publication Data

US 2021/0157506 A1 May 27, 2021

Related U.S. Application Data

(63) Continuation of application No. 16/363,741, filed on Mar. 25, 2019, now Pat. No. 10,922,010.

(51) Int. Cl.
| | |
|---|---|
| *G06F 3/06* | (2006.01) |
| *G11C 11/56* | (2006.01) |
| *G11C 16/10* | (2006.01) |
| *G11C 16/14* | (2006.01) |
| *G11C 16/26* | (2006.01) |

(Continued)

(52) U.S. Cl.
CPC .......... *G06F 3/0652* (2013.01); *G06F 3/0619* (2013.01); *G06F 3/0679* (2013.01); *G11C 11/5628* (2013.01); *G11C 11/5635* (2013.01); *G11C 11/5642* (2013.01); *G11C 11/5671* (2013.01); *G11C 16/10* (2013.01);
(Continued)

(58) Field of Classification Search
CPC .... G06F 3/0652; G06F 3/0619; G06F 3/0679; G11C 11/5628; G11C 11/5642; G11C 11/5671; G11C 16/10; G11C 16/14; G11C 16/26
See application file for complete search history.

(56) References Cited

U.S. PATENT DOCUMENTS

| | | | |
|---|---|---|---|
| 9,703,494 B1 | 7/2017 | Rajwade et al. | |
| 10,319,445 B1 | 6/2019 | Solanki et al. | |

(Continued)

FOREIGN PATENT DOCUMENTS

| | | |
|---|---|---|
| CN | 103814409 | 5/2014 |
| CN | 107093448 | 8/2017 |

(Continued)

OTHER PUBLICATIONS

"How SSDs work: Architecture, TLC vs. MLC NAND, & Endurance", "Steve Burke", Gamersnexus.net, 2014 (Year: 2014).*

(Continued)

*Primary Examiner* — Edward J Dudek, Jr.
(74) *Attorney, Agent, or Firm* — Schwegman Lundberg & Woessner, P.A.

(57) ABSTRACT

Apparatus and methods are disclosed, including receiving an indication to selectively erase first data stored on a first page of a first subset of a group of multi-level memory cells of the storage system, each multi-level memory cell comprising multiple pages and providing, in response the indication to selectively erase the first data, at least one soft erase pulse to the first page of memory cells associated with the first data to induce distribution overlap across different bit levels of the first page of the group of multi-level memory cell.

23 Claims, 8 Drawing Sheets

(51) Int. Cl.
    *G11C 16/08* (2006.01)
    *G11C 16/04* (2006.01)
(52) U.S. Cl.
    CPC .............. *G11C 16/14* (2013.01); *G11C 16/26* (2013.01); *G11C 16/0483* (2013.01); *G11C 16/08* (2013.01)

(56) References Cited

U.S. PATENT DOCUMENTS

| | | | |
|---|---|---|---|
| 10,922,010 B2 | 2/2021 | Cariello et al. | |
| 2011/0208898 A1 | 8/2011 | Shin | |
| 2014/0059406 A1 | 2/2014 | Hyun et al. | |
| 2016/0034217 A1 | 2/2016 | Kim et al. | |
| 2016/0170671 A1* | 6/2016 | Huang | G06F 3/0679 711/103 |
| 2018/0032541 A1 | 2/2018 | Park et al. | |
| 2019/0066799 A1* | 2/2019 | Luo | G11C 11/5635 |
| 2019/0088340 A1 | 3/2019 | Shirakawa | |
| 2020/0133767 A1* | 4/2020 | Yang | H03M 13/1111 |
| 2020/0310672 A1 | 10/2020 | Cariello et al. | |
| 2020/0395087 A1* | 12/2020 | Banerjee | G11C 16/14 |

FOREIGN PATENT DOCUMENTS

| | | |
|---|---|---|
| CN | 111736759 | 10/2020 |
| KR | 20160016481 A | 2/2016 |
| WO | 2019046230 | 3/2019 |

OTHER PUBLICATIONS

"Chinese Application Serial No. 202010219372.9, Response to Examiners Telephone Interview Summary Filed May 26, 2021", w English Claims, 38 pgs.

"Chinese Application Serial No. 202010219372.9, Voluntary Amendment Filed Jan. 28, 2021", w English Claims, 38 pgs.

* cited by examiner

MODIFIED ERASE

PRIORITY APPLICATION

This application is a continuation of U.S. application Ser. No. 16/363,741, filed 25 May 2019, which is herein incorporated by reference in its entirety.

BACKGROUND

Memory devices are semiconductor circuits that provide electronic storage of data for a host system e.g., a computer or other electronic device). Memory devices may be volatile or non-volatile. Volatile memory requires power to maintain data, and includes devices such as random-access memory (RAM), static random-access memory (SRAM), dynamic random-access memory (DRAM), or synchronous dynamic random-access memory (SDRAM), among others. Non-volatile memory can retain stored data when not powered, and includes devices such as flash memory, read-only memory (ROM), electrically erasable programmable ROM (EEPROM), erasable programmable ROM (EPROM), resistance variable memory, such as phase change random access memory (PCRAM), resistive random-access memory (RRAM), or magnetoresistive random access memory (MRAM), among others.

Host systems typically include a host processor, a first amount of main memory (e.g., often volatile memory, such as DRAM) to support the host processor, and one or more storage systems e.g., often non-volatile memory, such as flash memory) that provide additional storage to retain data in addition to or separate from the main memory.

A storage system, such as a solid-state drive (SSD), can include a memory controller and one or more memory devices, including a number of (e.g., multiple) dies or logical units (LUNs). In certain examples, each die can include a number of memory arrays and peripheral circuitry thereon, such as die logic or a die processor. The memory controller can include interface circuitry configured to communicate with a host device (e.g., the host processor or interface circuitry) through a communication interface (e.g., a bidirectional parallel or serial communication interface). The memory controller can receive commands or operations from the host system in association with memory operations or instructions, such as read or write operations to transfer data (e.g., user data and associated integrity data, such as error data or address data, etc.) between the memory devices and the host device, erase operations to erase data from the memory devices, perform drive management operations (e.g., data migration, garbage collection, block retirement), etc.

Software (e.g., programs), instructions, operating systems (OS), and other data are typically stored on storage systems and accessed by main memory for use by the host processor. Main memory (e.g., RAM) is typically faster, more expensive, and a different type of memory device (e.g., volatile) than a majority of the memory devices of the storage system (e.g., non-volatile, such as an SSD, etc.). In addition to the main memory, host systems can include different levels of volatile memory, such as a group of static memory (e.g., a cache, often SRAM), often faster than the main memory, in certain examples, configured to operate at speeds close to or exceeding the speed of the host processor, but with lower density and higher cost.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, systems, methods, and apparatus to selectively destroy data in a storage system, providing secure, unrecoverable data removal, such as during a purge operation.

Existing storage system data removal, such as through garbage collection, block erase, or purge operations, can be resource and time intensive. Forced data removal is typically more intensive than other standard memory operations (e.g., read, write, erase, etc.), in certain examples, providing higher temperatures and processing in the device, and impacting lifespan of the storage system. Further, for voltage drifts and mixed level-capacity usage (e.g., single-level capacity, multi-level capacity, etc.), it may not be convenient for firmware to fully erase a block in advance, as forcing such behavior may lead to or require double erasure for certain blocks, further impacting system performance. Moreover, purge operations are rarely implemented in normal operation (e.g., normal usage by a user, etc.). However, such commands can be useful in certain conditions, such as during manufacturer testing, etc.

The present inventors have recognized, among other things, systems, methods, and apparatus to selectively destroy data on a selected page of a multi-level cell (MLC) while maintaining remaining data on non-selected pages. For example, in a triple-level cell (TLC) memory cell defining three pages (e.g., a lower page (LP), an upper page (UP), and an extra page (XP)), such systems, methods, and apparatus can destroy data on a selected one of the three pages without altering or destroying the data on the other two pages. Such systems, methods, and apparatus can be applied to other MLC memory cells, such as two-level cells (commonly referred to as MLC), quad-level cells (QLC), etc. In contrast to other data removal methods, such systems, methods, and apparatus can selectively destroy data with limited program disturb to non-selected data, separately from or in combination with a modified erase on garbage blocks.

Figure 1:
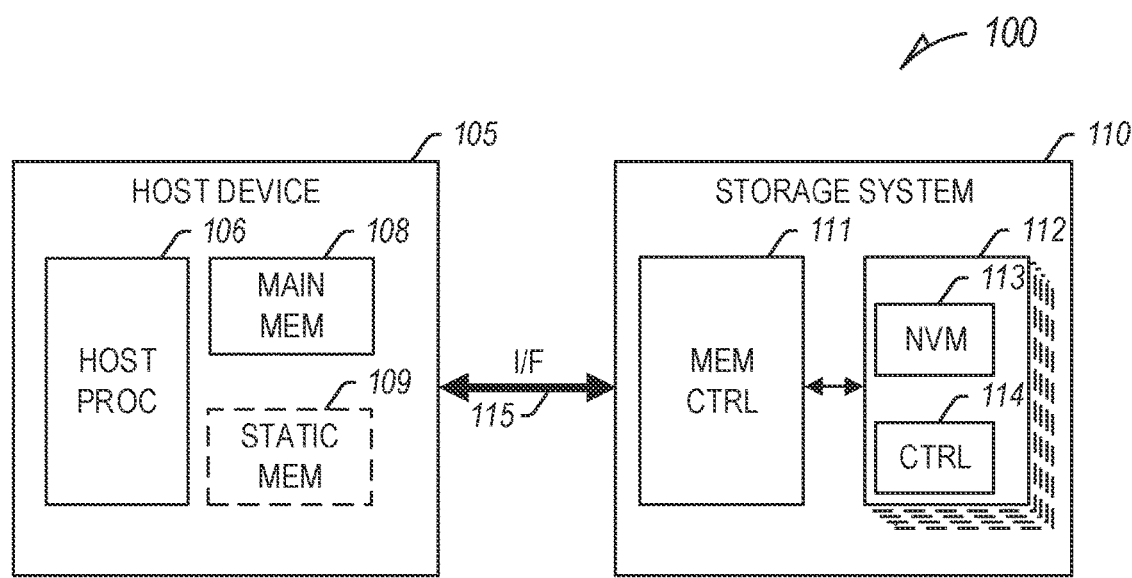
FIG. 1 illustrates an example host system including a host device and a storage system.

FIG. 1 illustrates an example system (e.g., a host system) 100 including a host device 105 and a storage system 110 configured to communicate over a communication interface (I/F) 115 (e.g., a bidirectional parallel or serial communication interface). In an example, the communication interface 115 can be referred to as a host interface. The host device 105 can include a host processor 106 (e.g., a host central processing unit (CPU) or other processor or processing device) or other host circuitry (e.g., a memory management unit (MMU), interface circuitry, etc.). In certain examples, the host device 105 can include a main memory (MAIN MEM) 108 (e.g., DRAM, etc.) and optionally, a static memory (STATIC MEM) 109, to support operation of the host processor (HOST PROC) 106.

The storage system 110 can include a universal flash storage (UFS) device, an embedded MMC (eMMC™) device, or one or more other memory devices. For example, if the storage system 110 includes a UFS device, the communication interface 115 can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.). In another example, if the storage system 110 includes an eMMC device, the communication interface 115 can include a number of parallel bidirectional data lines (e.g., DAT[7:0]) and one or more command lines, such as defined in one or more JEDEC standards (e.g., JEDEC standard D84-B51 (JESD84-A51) commonly referred to as JEDEC eMMC standard 5.1, etc.). In other examples, the storage system 110 can include one or more other memory devices, or the communication interface 115 can include one or more other interfaces, depending on the host device 105 and the storage system 110.

The storage system 110 can include a memory controller (MEM CTRL) 111 and a non-volatile memory device 112. In an example, the non-volatile memory device 112 can include a number of non-volatile memory devices (e.g., dies or LUNs), such as one or more stacked flash memory devices (e.g., as illustrated with the stacked dashes underneath the non-volatile memory device 112), etc., each including non-volatile memory (NVM) 113 (e.g., one or more groups of non-volatile memory cells) and a device controller (CTRL) 114 or other periphery circuitry thereon (e.g., device logic, etc.), and controlled by the memory controller 111 over an internal storage-system communication interface 116 (e.g., an Open NAND Flash Interface (ONFI) bus, etc.) separate from the communication interface 115.

Flash memory devices typically include one or more groups of one-transistor, floating gate (FG) or replacement gate (RG) memory cells. Two common types of flash memory array architectures include NAND and NOR architectures. The memory cells of the memory array are typically arranged in a matrix. The gates of each memory cell in a row of the array are coupled to an access line (e.g., a word line). In NOR architecture, the drains of each memory cell in a column of the array are coupled to a data line (e.g., a bit line). In NAND architecture, the drains of each memory cell in a column of the array are coupled together in series, source to drain, between a source line and a bit line.

Each memory cell in a NOR, NAND, 3D Cross Point, HRAM, MRAM, or one or more other architecture semiconductor memory array can be programmed individually or collectively to one or a number of programmed states. A single-level cell (SLC) can represent one bit of data per cell in one of two programmed states (e.g., 1 or 0). A multi-level cell (MLC) can represent two or more bits of data per cell in a number of programmed states (e.g., $2^n$, where n is the number of bits of data). In certain examples, MLC can refer to a memory cell that can store two bits of data in one of 4 programmed states. A triple-level cell (TLC) can represent three bits of data per cell in one of 8 programmed states. A quad-level cell (QLC) can represent four bits of data per cell in one of 16 programmed states. In other examples, MLC can refer to any memory cell that can store more than one bit of data per cell, including TLC and QLC, etc.

The storage system 110 can include a multimedia card (MMC) solid-state storage device (e.g., micro secure digital (SD) cards, etc.). MMC devices include a number of parallel interfaces (e.g., an 8-bit parallel interface) with a host device 105, and are often removable and separate components from the host device. In contrast, embedded MMC (eMMC) devices are attached to a circuit board and considered a component of the host device, with read speeds that rival serial ATA (SATA) based SSD devices. As demand for mobile device performance continues to increase, such as to fully enable virtual or augmented-reality devices, utilize increasing networks speeds, etc., storage systems have shifted from parallel to serial communication interfaces between the storage system and a host device. UFS devices, including controllers and firmware, communicate with a host device using a low-voltage differential signaling (LVDS) serial interface with dedicated read/write paths, further advancing read/write speeds between a host device and a storage system.

In three-dimensional (3D) architecture semiconductor memory device technology, vertical floating gate (FG) or replacement gate (RG) (or charge trapping) storage structures can be stacked, increasing the number of tiers, physical pages, and accordingly, the density of memory cells in a memory device. Data is often stored arbitrarily on the storage system as small units. Even if accessed as a single unit, data can be received in small, random 4-16 k single file reads (e.g., 60%-80% of operations are smaller than 16 k). It is difficult for a user and even kernel applications to indicate that data should be stored as one sequential cohesive unit. File systems are typically designed to optimize space usage, and not sequential retrieval space.

The memory controller 111 can receive instructions from the host device 105, and can communicate with the non-volatile memory device 112, such as to transfer data to (e.g., write or erase) or from (e.g., read) one or more of the memory cells of the non-volatile memory device 112. The memory controller 111 can include, among other things, circuitry or firmware, such as a number of components or integrated circuits. For example, the memory controller 111 can include one or more memory control units, circuits, or components configured to control access across the memory array and to provide a translation layer between the host device 105 and the storage system 100.

The non-volatile memory device 112 or the non-volatile memory 113 (e.g., one or more 3D NAND architecture semiconductor memory arrays) can include a number of memory cells arranged in, for example, a number of devices, planes, blocks, physical pages, super blocks, or super pages. As one example, a TLC memory device can include 18,592 bytes (B) of data per page, 1536 pages per block, 548 blocks per plane, and 4 planes per device. As another example, an MLC memory device can include 18,592 bytes (B) of data per page, 1024 pages per block, 548 blocks per plane, and 4 planes per device, but with half the required write time and twice the program/erase (P/E) cycles as a corresponding TLC memory device. Other examples can include other numbers or arrangements. A super block can include a combination of multiple blocks, such as from different planes, etc., and a window can refer to a stripe in a super block, typically matching a portion covered by a physicalto-logical (P2L) table chunk, etc., and a super page can include a combination of multiple pages.

In operation, data is typically written to or read from the storage system 110 in pages and erased in blocks. However, one or more memory operations (e.g., read, write, erase, etc.) can be performed on larger or smaller groups of memory cells, as desired. For example, a partial update of tagged data from an offload unit can be collected during data migration or garbage collection to ensure it was re-written efficiently. The data transfer size of a memory device is typically referred to as a page, whereas the data transfer size of a host device is typically referred to as a sector. Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512B) as well as a number of bytes (e.g., 32B, 54B, 224B, etc.) of metadata corresponding to the user data, such as integrity data (e.g., error detecting or correcting code data), address data (e.g., logical address data, etc.), or other metadata associated with the user data.

Different types of memory cells or memory arrays can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code (ECC) data than a memory device with a lower bit error rate). As an example, an MLC NAND flash device may have a higher bit error rate than a corresponding SLC NAND flash device. As such, the MLC device may require more metadata bytes for error data than the corresponding SLC device.

In an example, the data in a chunk or data unit can be handled in an optimized manner throughout its tenure on the storage system. For example, the data is managed as one unit during data migration (e.g., garbage collection, etc.) such that the efficient read/write properties are preserved as data is moved to its new physical location on the storage system. In certain examples, the only limit to the number of chunks, data units, or blocks configurable for storage, tagging, etc., are the capacities of the system.

Figure 2:
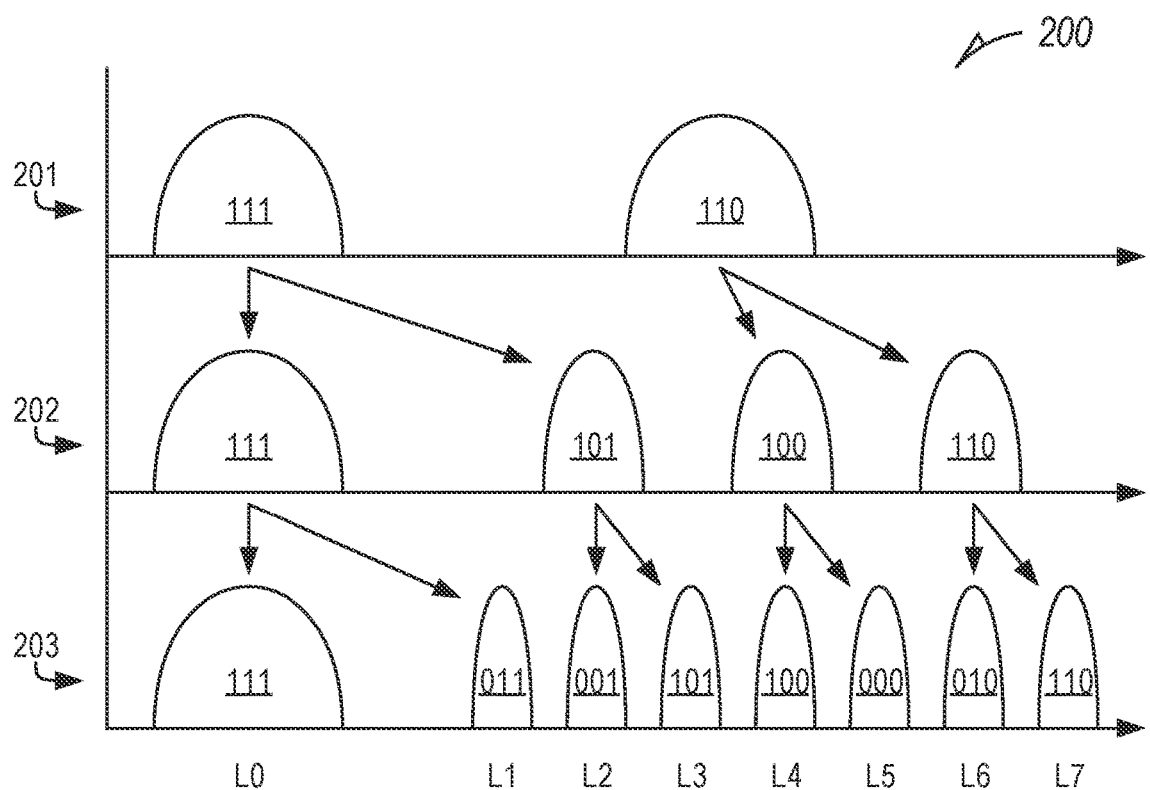
FIG. 2 illustrates example programming of a triple-level cell (TLC) memory cell.

FIG. 2 illustrates example programming 200 of a triple-level cell (TLC) memory cell, such as a floating gate (FG) TLC memory cell, using a multi-pass programming technique. Although illustrated herein with respect to a TLC memory cell, similar techniques can be used on other level memory cells (e.g., MLC, QLC, etc.). Prior to programming, the TLC memory cell can be erased to a first erase state (e.g. a first bit level 111) using one or more erase pulses, depending on a prior state of the TLC memory cell. The TLC memory cell includes three pages: a lower page (LP), representing the third bit; an upper page (UP), representing the middle, second bit; and an extra page (XP), representing the first bit.

At 201, a first programming pass, representing one or more first programming pulses, can program the LP of the TLC memory cell as either "1" or "0". At 202, a second programming pass, representing one or more second programming pulses, can program the UP of the TLC memory cell as either "1" or "0" from either of the LP values. At 203, a third programming pass, representing one or more third programming pulses, can program the XP of the TLC memory cell as either "1" or "0", resulting in one of 8 separate bit levels represented by a 3-digit binary number, such as illustrated in FIG. 3.

In other examples, the TLC memory cell can be programmed using one or more other techniques, such as a single-pass, variable programming pulse, etc. Further, other semiconductor architectures, such as replacement gate (RG) (or charge trapping) architectures, may have other bit structures, page organization, or may be programmed using one or more other techniques.

Figure 3:
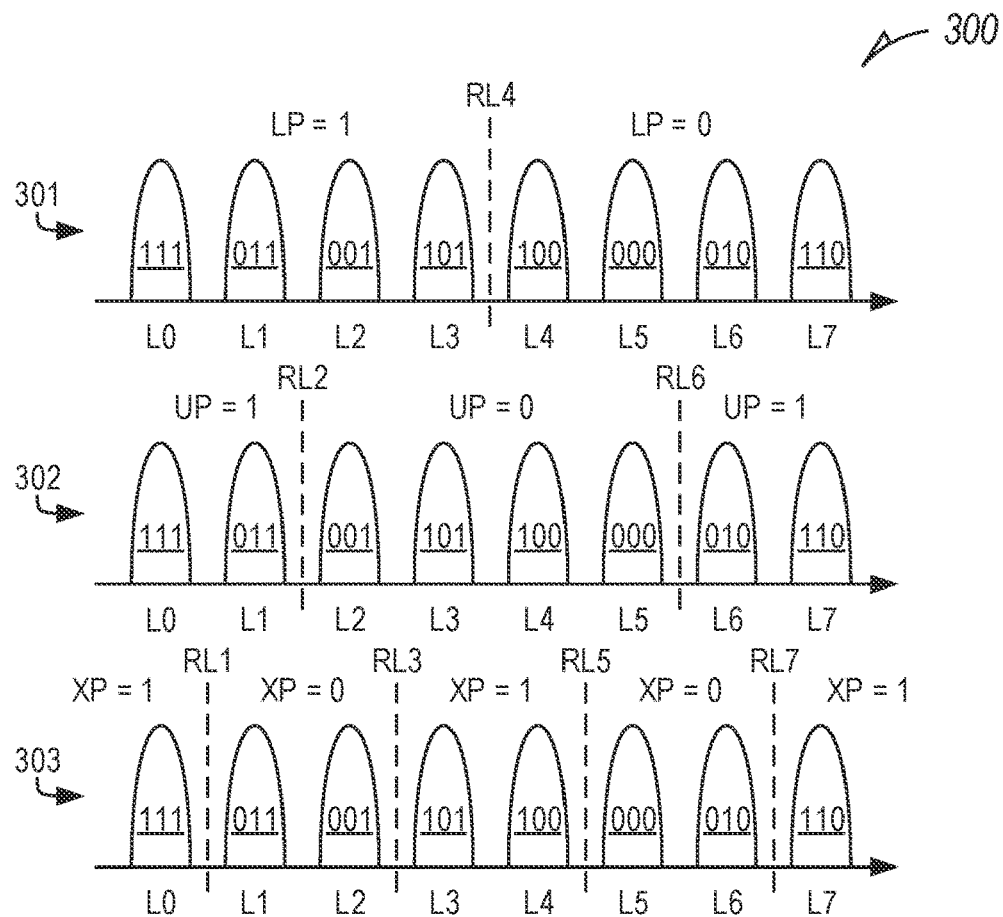
FIG. 3 illustrates example levels and read levels of a TLC memory cell.

FIG. 3 illustrates example levels and read level distributions 300 of a TLC memory cell, such as that illustrated in FIG. 2. The TLC memory cell can include 8 separate levels, from a first level through an eight level (L0-L7), with separate read levels between the different levels (RL1-RL7). A lower page (LP) distribution 301 can be determined using a read operation at a fourth read level (RL4) between the third and fourth levels (L3, L4). A read value below RL4 indicates an LP state "1" belonging to one of the lower four levels, L0-L3, whereas a read value above RL4 indicates an LP state "0" belonging to one of the upper four levels, L4-L7.

An upper page (UP) distribution 302 can be determined using one or more read operations (e.g., one or two) at a second read level (RL2) or a sixth read level (RL6) between the first and second levels (L1, L2) or the fifth and sixth levels (L5, L6), respectively. A read value below RL2 or above RL6 indicates an UP state "1", whereas a read value between RL2 and RL6 indicates an UP state "0".

An extra page (XP) distribution 303 can be determined using one or more read operations (e.g., between one and four) at a first read level (RL1), a third read level (RL3), a fifth read level (RL5), or a seventh read level (RL7). A read value below RL1, above RL7, or between RL3 and RL5 indicates an XP state "1", whereas a read value between RL1 and RL3 or RL5 and RL7 indicates an XP state "0". In other examples, other distributions of bit states can be contemplated, such as depending on other semiconductor architectures, etc.

Figure 4:
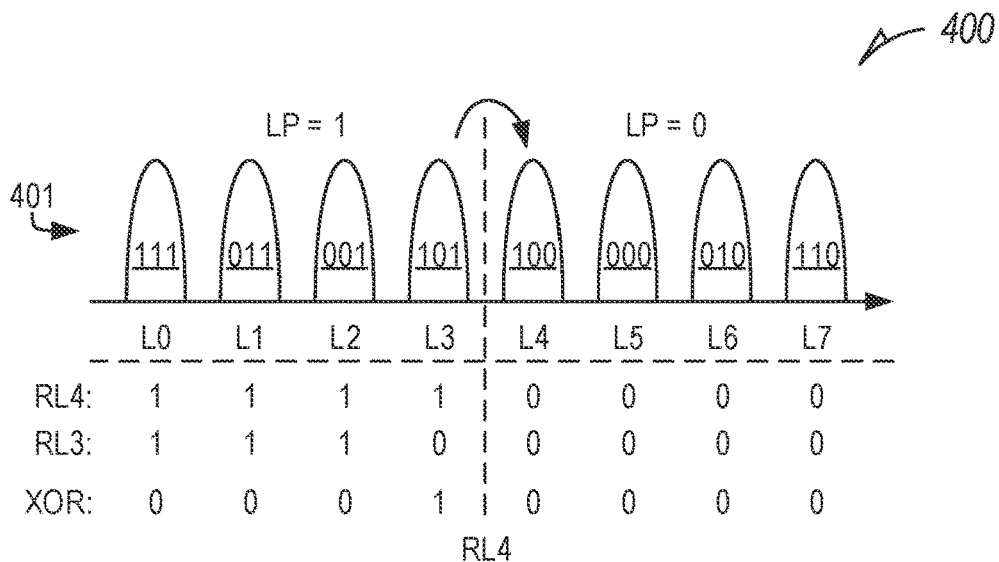
FIGS. 4-6 illustrate example selective overwrite conditions.
Figure 5:
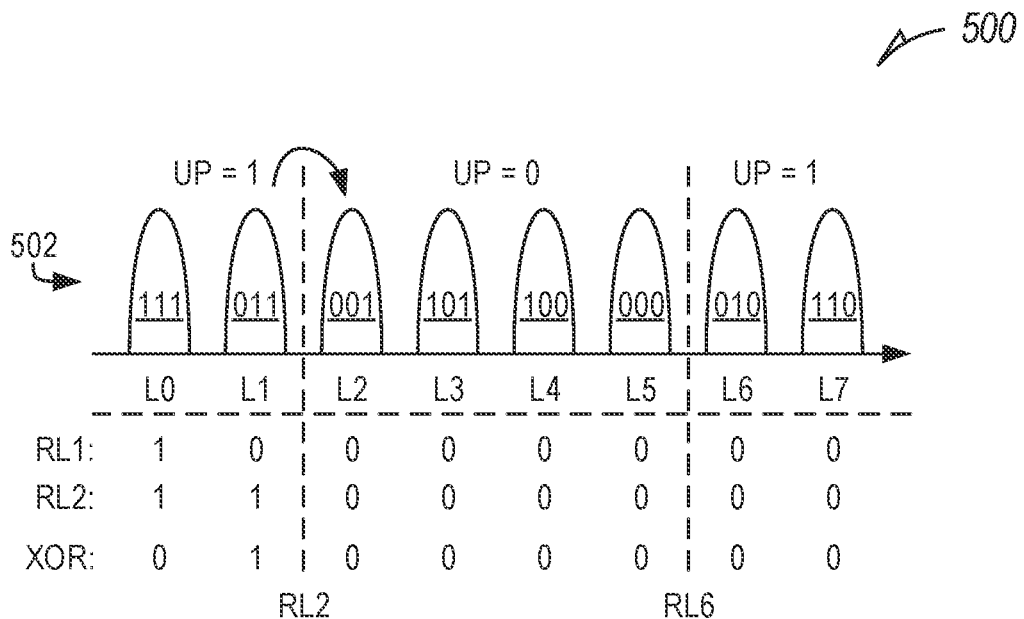
Figure 6:
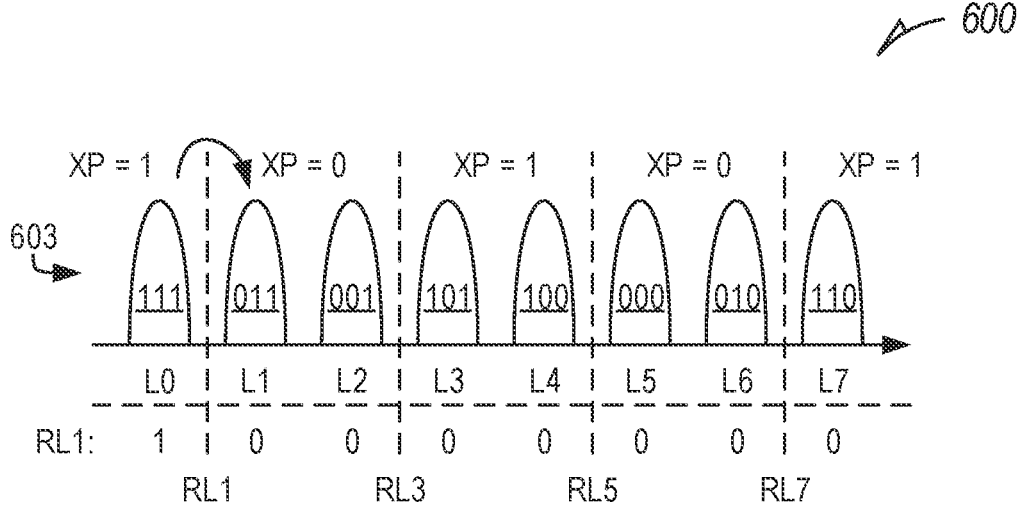

FIGS. 4-6 illustrate example selective overwrite conditions for a specific distribution of cells across a data unit (e.g., 4 kB, etc.). For example, cells within a specific distribution, such as programmed to a specific level, can be programmed to another level (e.g., selected cells can be programmed while remaining cells are inhibited), destroying data in one of the multiple pages of the memory cells without altering, destroying, or severely impacting data stored on the one or more other pages of the memory cells.

FIG. 4 illustrates example data removal 400 from a lower page (LP) of a TLC memory cell. At level 3 (L3) of the LP distribution 401, the bit state of the TLC memory cell is "101", versus level 4 (L4), where the bit state is "100". In the transition between L3 and L4 the LP bit changes from "1" to "0" while the first two bits, representing the upper page (UP) and the extra page (XP), remain unchanged. Accordingly, to destroy data written to the LP of a TLC memory cell with a value in L3, the cell can be programmed or written to L4 without altering the data stored on the remaining pages, here, the UP and the XP. In an example, L4 is a successive level to L3 (e.g., as L2 is successive to L1, and L1 to L0, etc.). Successive, in such context, can be one additional programming level away from an erased state.

To determine which TLC cell or cells across a distribution can be programmed to destroy data in the LP, the cell or cells programmed to L3 can be identified. In an example, reads can be performed across the distribution at read levels 3 and 4 (RL3 and RL4), and an exclusive or (XOR) operation can be performed on the results of such read operations to indicate which cell or cells in the distribution are assigned to L3. FIG. 4 illustrates example read outputs at RL3 and RL4, as well as XOR results of such read outputs, for a cell programmed to L3. In other examples, other methods can be used, such as if each bit state is known or can otherwise be determined by control circuitry of the memory device, storage system, or the host device. Once determined, a programming pulse can be applied to transition the identified cell or cells from L3 to L4, such as illustrated by the arrow in FIG. 4, destroying the data on such cell or cells while retaining data on the remaining pages.

FIG. 5 illustrates example data removal 500 from an upper page (UP) of a TLC memory cell. In contrast to that illustrated in FIG. 4, there are two levels of the UP distribution 501 where the UP bit changes and the remaining pages stay unchanged. In the transitions from level 1 (L1) to level 2 (L2) the UP bit changes from "1" to "0" and the remaining bits remain unchanged, and from level 5 (L5) to level 6 (L6) the UP bit changes from a "0" to a "1" and the remaining bits remain unchanged. Accordingly, to destroy data written to the UP of a TLC memory cell with a value in either L1 or L5, the cell can be programmed or written one additional level, to L2 or L6, respectively, without altering the data stored on the remaining pages.

To determine which TLC cell or cells across a distribution can be programmed to destroy data in the UP, the cell or cells programmed to L1 or L5 can be identified. In an example, to identify the cell or cells programmed to L1, reads can be performed across the distribution at read levels 1 and 2 (RL1 and RL2), and an exclusive or (XOR) operation can be performed on the results of such read operations to indicate which cell or cells in the distribution are assigned to L1. FIG. 5 illustrates example read outputs at RL1 and RL2, as well as XOR results of such read outputs, for a cell programmed to L1. Once determined, a programming pulse can be applied to transition the identified cell or cells, for example, from L1 to L2, such as illustrated by the arrow in FIG. 5, destroying data on the UP of such cell or cells while retaining data on the remaining pages.

In other examples, to identify the cell or cells programmed to L5, reads can be performed across the distribution at read levels 5 and 6 (RL5 and RL6), and an XOR operation can be performed on the results of such read operations to indicate which cells are assigned to L5. In certain examples, cells programmed to one or both of L1 and L5 can be identified. In other examples, other methods can be used, such as if each bit state is known or can otherwise be determined by control circuitry of the memory device, storage system, or the host device. Once determined, a programming pulse can be applied to transition the identified cell or cells one programming level (e.g., from L1 to L2, from L5 to L6, or both from L1 to L2 and L5 to L6), destroying the data on the UP of such cell or cells while retaining data on the remaining pages.

FIG. 6 illustrates example data removal from an extra page (XP) of a TLC memory cell. In contrast to that illustrated in FIGS. 4 and 5, there are four levels of the XP distribution 601 where the XP bit changes and the remaining pages stay unchanged. In the transitions from level 0 (L0) to level 1 (L1) and from level 4 (L4) to level 5 (L5) the XP bit changes from "1" to "0" and the remaining bits remain unchanged. In the transitions from level 2 (L2) to level 3 (L3) and from level 6 (L6) to level 7 (L7) the XP bit changes from "0" to "1" and the remaining bits remain unchanged. Accordingly, to destroy data written to the XP of a TLC memory cell with a value in either L0, L2, L4, or L6, the cell can be programmed or written one additional level, to L1, L3, L5, or L7, respectively, without altering the data stored on the remaining pages.

To determine which TLC cell or cells across a distribution can be programmed to destroy data in the XP, the cell or cells programmed to one of L0, L2, L4, or L6 can be identified. In an example, to identify the cell or cells programmed to L0, a single read can be performed at read level 1 (RL1) to indicate which cell or cells in the distribution are assigned to L0. FIG. 6 illustrates example read outputs at RL1 for a cell programmed to L0. Once determined, a programming pulse can be applied to transition the identified cell or cells, from example, from L0 to L1, such as illustrated by the arrow in FIG. 6, destroying data on the XP of such cell or cells while retaining data on the remaining pages.

In an example, to identify the cell or cells programmed to L2, L4, or L6, reads can be performed across the distribution. To identify the cell or cells programmed to L2, reads can be performed across the distribution at read levels 2 and 3 (RL2 and RL3), and an exclusive or (XOR) operation can be performed on the results of such read operation (similar to that illustrated in FIGS. 4 and 5) to indicate which cell or cells in the distribution are assigned to L2. To identify the cell or cells programmed to L4, reads can be performed across the distribution at read levels 4 and 5 (RL4 and RL5), and an exclusive or (XOR) operation can be performed on the results of such read operation (similar to that illustrated in FIGS. 4 and 5) to indicate which cell or cells in the distribution are assigned to L4. To identify the cell or cells programmed to L6, reads can be performed across the distribution at read levels 6 and 7 (RL6 and RL7), and an exclusive or (XOR) operation can be performed on the results of such read operation (similar to that illustrated in FIGS. 4 and 5) to indicate which cell or cells in the distribution are assigned to L6. Once identified cells are determined, a programming pulse can be applied to transition the identified cell or cells one programming level (e.g., from L0 to L1, from L2 to L3, from L4 to L5, from L6 to L7, or any combination thereof), destroying data on the XP of such cell or cells while retaining data on the remaining pages. In various examples, although cells can be identified at more than one level in a distribution and programmed to destroy data on a particular page, often only a single level is required to sufficiently destroy desired data.

Although the examples of FIGS. 4-6 are directed to TLC memory cells can distributions, in other examples, the systems, apparatus, methods, or techniques described above are applicable to other types or levels of memory cells, such as MLC, QLC, etc. Further, although the examples of FIGS. 4-6 are directed to floating gate (FG) memory cells and distributions, in other examples, the systems, apparatus, methods, or techniques described above are applicable to other memory technologies, such as replacement gate (RG) (or charge trapping) memory cells. However, in contrast to those examples described above, the specified levels for RG TLC memory cells can vary with respect to FG TLC memory cells. For example, a cell or cells within a distribution assigned to L0 can be identified and programmed or written to L1 to destroy data written to the LP of an RG TLC memory cell without altering the data stored on the remaining pages, a cell or cells within a distribution assigned to L1 can be identified and programmed or written to L2 to destroy data written to the UP of an RG TLC memory cell without altering the data stored on the remaining pages, and a cell or cells within a distribution assigned to L2 can be identified and programmed or written to L3 to destroy data written to the XP of an RG TLC memory cell without altering the data stored on the remaining pages.

In certain examples, to reduce induced charge disturbance on neighboring or nearby cells, the firmware (FW) can track and limit the times this operation or technique is invoked on an individual block, or assess the risks and benefits before performing such operation. For example, the memory device can check current bit error rate (BER) of a nearby valid segment or perform such operation only if the invalid segments to be removed have counts of such operations, reads, or writes below a threshold. The firmware can be required to track unmapped logical block addresses (LBA). In other examples, this can be accomplished using a dedicated bit in the physical pointers in any logical-to-physical (L2P) table for the memory device. Security can require previous copies of the data removed as well.

Figure 7:
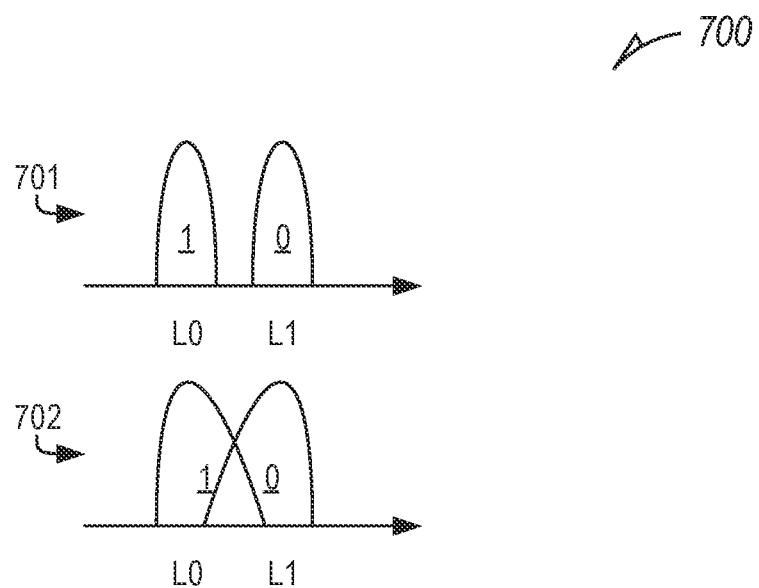
FIGS. 7-8 illustrate example modified erase distributions.
Figure 8:
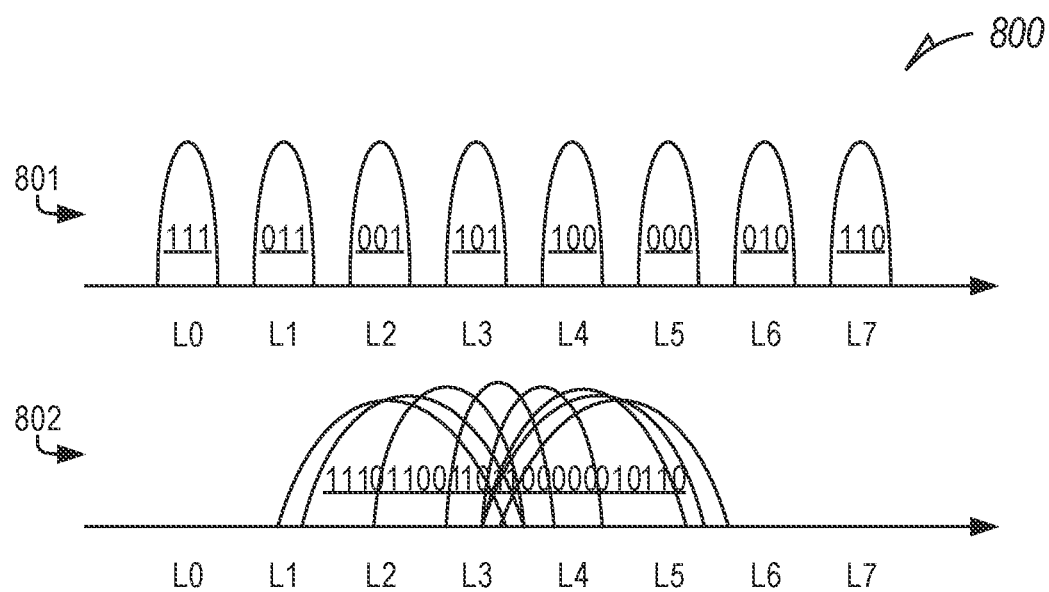

FIGS. 7-8 illustrate example modified erase distributions 700, 800. FIG. 7 illustrates an example modified erase distribution 700 for first and second bits, "1" and "0", at first and second levels, level 0 (L0) and level 1 (L1). In a first distribution 701, the first and second bits and levels are distinct with clear and separate boundaries. In a second distribution 702, the boundaries, bit states, and levels overlap. Similarly, FIG. 8 illustrates an example modified erase distribution 800 for eight bits at eight levels, level 0 (L0) through level 7 (L7). In a first distribution 801, the eight bits and levels are distinct with clear and separate boundaries. In a second distribution 802, the boundaries, bit states, and levels overlap.

In certain examples, a partial erase operation, or one or more soft erase pulses to the first distribution 701, 801 can result in the second distribution 702, 802. In an example, control circuitry, such as a memory or a device controller, can provide at least one soft erase pulse to first data stored on a first page to induce distribution overlaps, thereby making recovery of stored data more difficult or impossible. Such partial erase or one or more soft erase pulses can be applied, such as in response to a received indication to selectively overwrite first data, in combination with or separate from one or more of the program pulses described herein. However, in certain examples, such partial erase or one or more soft erase pulses may alter data stored in each page of impacted memory cells.

Figure 9:
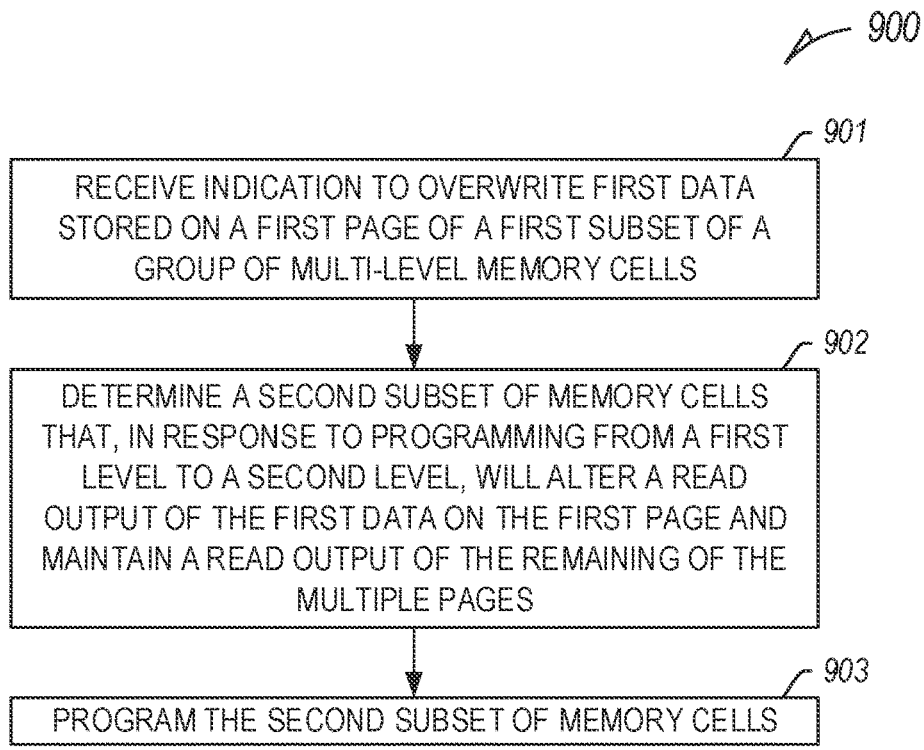
FIGS. 9-10 illustrate example selective overwrite methods.
Figure 10:
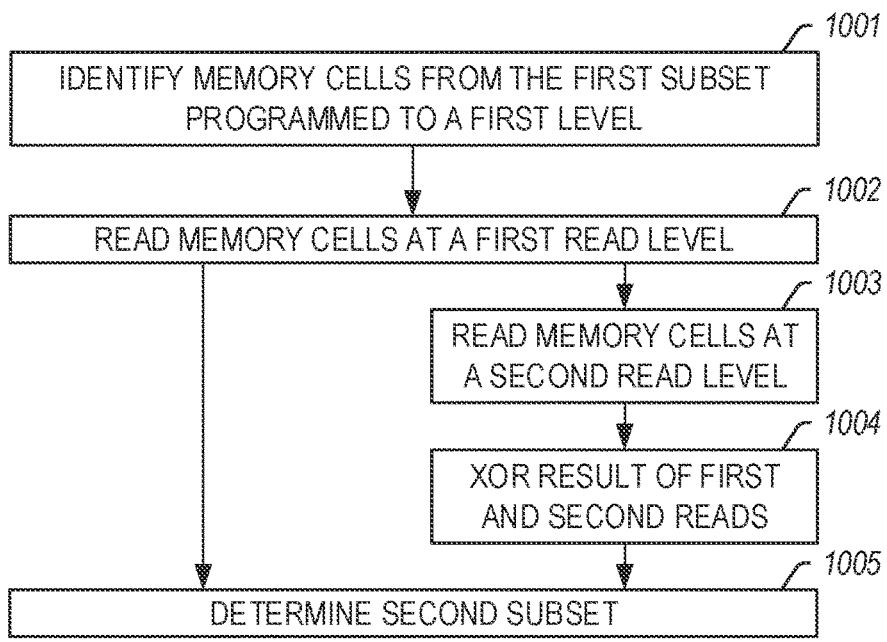

FIGS. 9-10 illustrate example selective overwrite methods. FIG. 9 illustrates an example selective overwrite method 900 including overwriting first data stored on a first page of a group of multi-level memory cells, each multi-level memory cell comprising multiple pages.

At 901, an indication to overwrite first data stored can be received, such as by control circuitry, including a memory controller of a storage system comprising multiple memory devices, or a device controller of one or more of the multiple memory devices. In an example, the indication can include an indication to overwrite first data stored on a first page of a first subset of a group of multi-level memory cells. For example, the multi-level memory cells can include MLC, TLC, QLC, or one or more other types of multi-level memory cells. The multi-level memory cells can include 3D NAND floating gate (FG) memory cells. The group of multi-level memory cells can include the memory cells in a non-volatile memory device, such as the non-volatile memory 113.

At 902, a second subset of memory cells can be determined, such as by the control circuitry, from the first subset of memory cells that, in response to programming from a first level to a second level, will alter a read output of the first data on the first page and maintain a read output of the remaining of the multiple pages. For example, if the first data is stored on the first subset of multi-level memory cells, the page of the cell or cells that the first data is stored can be determined, and the level at which each cell or cells associated with that first data can be determined, or at least the cell or cells associated with a specific level (e.g., the first level) for the first subset can be determined that, in response to programming on additional level (e.g., the second level), will alter a read output of the specific level of the determined cell or cells, while not altering a read output of the remaining or unspecified levels of the determined cell or cells, such as described above in FIGS. 4-6, etc.

At 903, once determined, the second subset of memory cells can be programmed, such as by the control circuitry, from the first level to the second level, to securely remove the first data stored on the first page, or alter it to make it unrecoverable, while maintaining data on the remaining of the multiple pages.

FIG. 10 illustrates an example selective overwrite method 1000 including determining a second subset of memory cells programmed to a first level of a distribution from the first subset of memory cells associated with first data.

At 1001, memory cells from the first subset programmed to the first level can be identified. The first level, in this context, doesn't refer to level 1 (L1), but instead as a label referring to a first level of the multiple levels of the multi-level memory cell. The first level is a specified level depending on the page on which the first data is stored on the memory cell. For example, a triple-level cell (TLC) memory cell includes three pages: a lower page (LP), an upper page (UP), and an extra page (XP). As described above with respect to FIGS. 4-6, the first level depends on which page the first data is stored on. For example, for floating gate (FG) TLC memory cells: if the first data is stored on a LP of a first subset of memory cells, the cell or cells programmed to level 3 (L3) can be identified; if the first data is stored on the UP of the first subset of memory cells, the cell or cells programmed to level 1 (L1) can be identified; and if the first data is stored on the XP of the first subset of memory cells, the cell or cells programmed to level 0 (L0) can be identified. In other memory cell technologies or types, other levels can be determined, consistent with the teachings herein. To identify the cell or cells programmed to a determined level, one or more read operations can be performed.

At 1002, memory cells at a first read level can be read, such as by control circuitry. In certain examples, only a single read is required, such as to identify memory cells programmed to L0 (with a single read at read level 1 (RL1)). In other examples, additional reads are required to determine or identify the programmed level.

At 1003, memory cells at a second level can be read, such as by control circuitry. For example, to identify memory cells programmed to L1, a first read is required at read level 1 (RL1) and a second read is required at read level 2 (RL2). At 1004, an exclusive or (XOR) operation can be performed on the results of the first and second reads to identify cells at the specified level, such as illustrated in FIGS. 4 and 5.

At 1005, the second subset of memory cells programmed to the first level can be determined using the results from one or more of the first or second reads or the XOR operation. In an example, once determined, the second subset of memory cells can be programmed, such as by the control circuitry.

Figure 11:
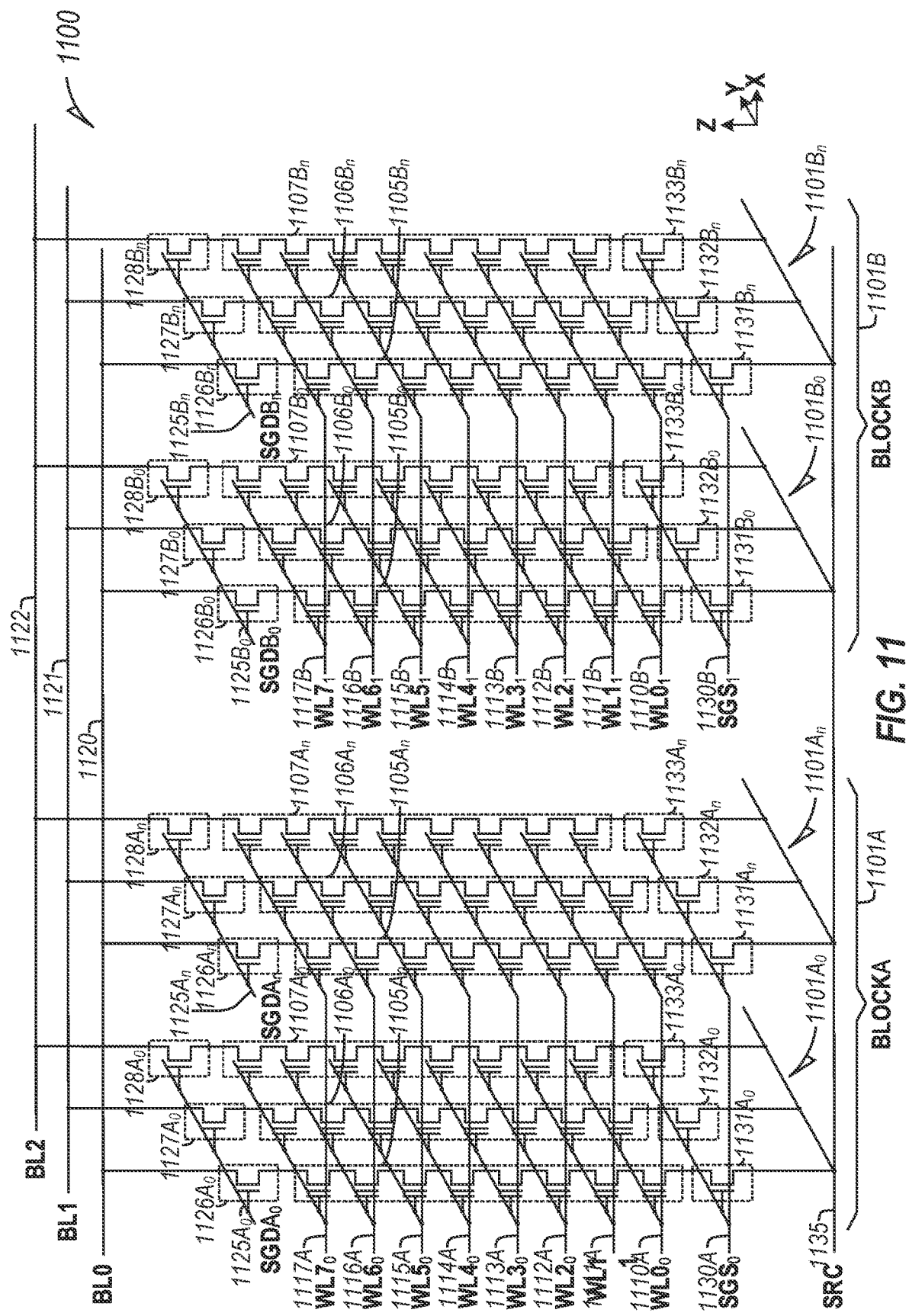
FIG. 11 illustrates an example schematic diagram of a 3D NAND architecture semiconductor memory array.

FIG. 11 illustrates an example schematic diagram of a 3D NAND architecture semiconductor memory array 1100 including a number of strings of memory cells (e.g., first-third $A_0$ memory strings $1105A_0$-$1107A_0$, first-third $A_n$ memory strings $1105A_n$-$1107A_n$, first-third $B_0$ memory strings $1105B_0$-$1107B_0$, first-third $B_n$, memory strings $1105B_n$-$1107B_n$, etc.), organized in blocks (e.g., block A 1101A, block B 1101B, etc.) and sub-blocks (e.g., sub-block $A_0$ $1101A_0$, sub-block $A_n$ $1101A_n$, sub-block $B_0$ $1101B_0$, sub-block $B_n$ $1101B_n$, etc.). The memory array 1100 represents a portion of a greater number of similar structures that would typically be found in a block, device, or other unit of a memory device.

Each string of memory cells includes a number of tiers of storage transistors (e.g., floating gate, replacement gate, charge trapping structures, etc.) stacked in the Z direction, source to drain, between a source line (SRC) 1135 or a source-side select gate (SGS) (e.g., first-third $A_0$-SGS $1131A_0$-$1133A_0$, first-third $A_n$ SGS $1131A_n$-$1133A_n$, first-third $B_0$ SGS $1131B_0$-$1133B_0$, first-third $B_n$ SGS $1131B_n$-$1133B_n$, etc.) and a drain-side select gate (SGD) (e.g., first-third $A_0$ SGD $1126A_0$-$1128A_0$, first-third $A_n$ SGD $1126A_n$-$1128A_n$, first-third $B_0$ SGD $1126B_0$-$1128B_0$, first-third $B_n$ SGD $1126B_n$-$1128B_n$, etc.), Each string of memory cells in the 3D memory array can be arranged along the X direction as data lines (e.g., bit lines (BL) BL0-BL3 1120-1122), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 1100 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 1100 includes a control gate (CG) coupled to (e.g., electrically or otherwise operatively connected to) an access line (e.g., word lines (WL) $WL0_0$-$WL7_0$ 1110A-1117A, $WL0_1$-$WL7_1$ 1110B-1117B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $1126A_0$-$1128A_0$ can be accessed using an $A_0$ SGD line $SGDA_0$ $1125A_0$, first-third $A_n$ SGD $1126A_n$-$1128A_n$ can be accessed using an A SGD line $SGDA_n$ $1125A_n$, first-third $B_0$ SGD $1126B_0$-$1128B_0$ can be accessed using a $B_0$ SGD line $SGDB_0$ $1125B_0$, and first-third B SGD $1126B_n$-$1128B_n$ can be accessed using a B SGD line $SGDB_n$ $1125B_n$. First-third $A_0$ SGS $1131A_0$-$1133A_0$ and first-third $A_n$ SGS $1131A_n$-$1133A_n$ can be accessed using a gate select line $SGS_0$ 1130A, and first-third $B_0$ SGS $1131B_0$-$1133B_0$ and first-third $B_n$ SGS $1131B_n$-$1133B_n$ can be accessed using a gate select line $SGS_1$ 1130B.

In an example, the memory array 1100 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

In a NAND architecture semiconductor memory array, the state of a selected memory cell can be accessed by sensing a current or voltage variation associated with a particular data line containing the selected memory cell. The memory array 1100 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., $WL4_0$), and thus, to a control gate of each memory cell coupled to the selected word lines. Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as Milo, a pass voltage of 10V can be applied to one or more other word lines, such as $WL3_0$, $WL5_0$, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to $WL4_0$, a pass voltage of 10V can be applied to $WL3_0$ and $WL5_0$, a pass voltage of 8V can be applied to $WL2_0$ and $WL6_9$, a pass voltage of 7V can be applied to $WL1_0$ and $WL7_0$, etc. In other examples, the pass voltages, or number of word lines, etc., can be higher or lower, or more or less.

Sense amplifiers can be coupled to one or more of the data lines (e.g., first, second, or third bit lines (BL0-BL2)) 1120-

1122), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 12:
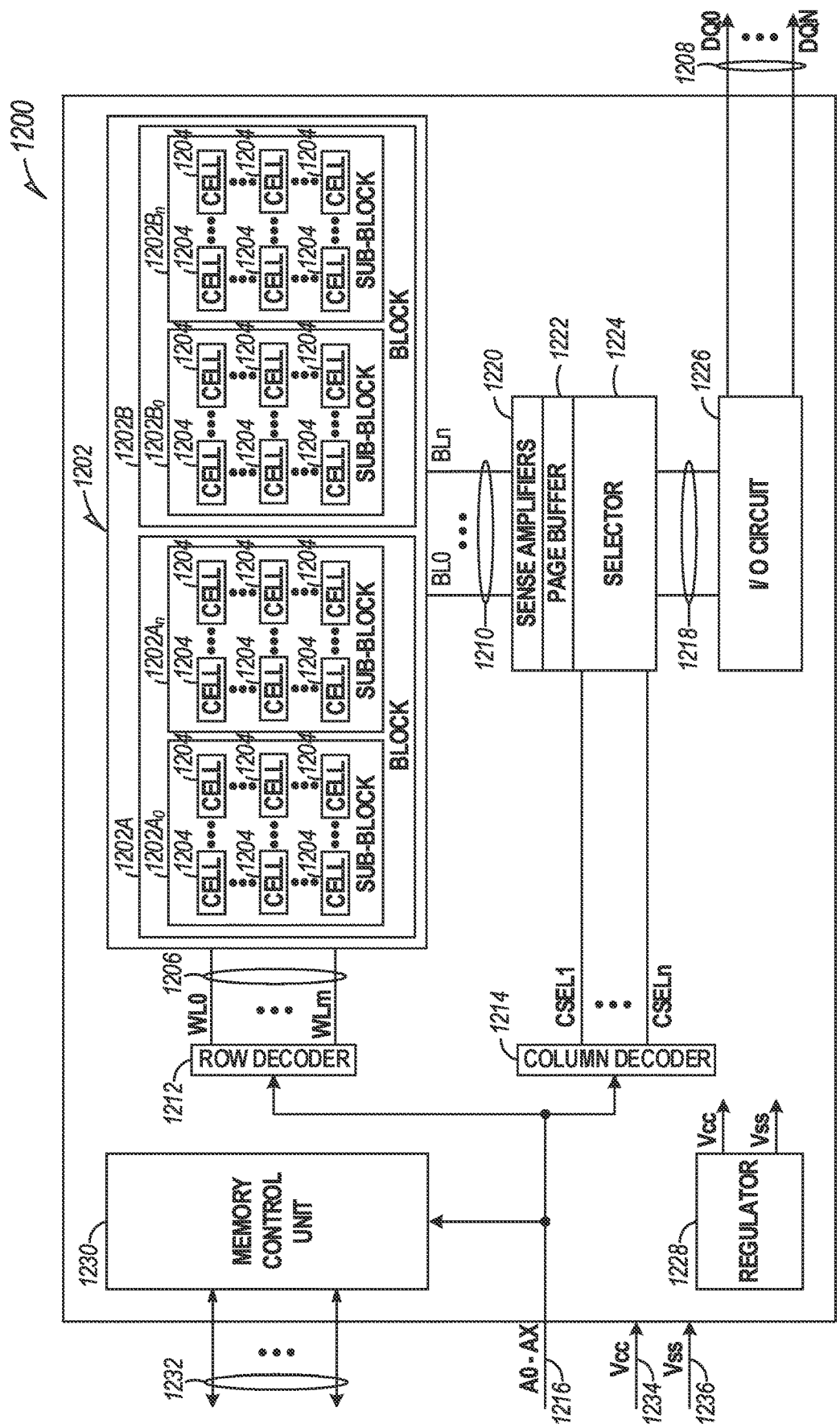
FIG. 12 illustrates an example block diagram of a memory module.

FIG. 12 illustrates an example block diagram of a memory device 1200 including a memory array 1202 having a plurality of memory cells 1204, and one or more circuits or components to provide communication with, or perform one or more memory operations on, the memory array 1202. Although shown with a single memory array 1202, in other examples, one or more additional memory arrays, dies, or LUNs can be included herein. In certain examples, in a storage system having a number of dies or LUNs, the memory device 1200 can represent a block diagram of circuits and components for each die or LUN. The memory device 1200 can include a row decoder 1212, a column decoder 1214, sense amplifiers 1220, a page buffer 1222, a selector 1224, an input/output (I/O) circuit 1226, and a memory control unit 1230.

The memory cells 1204 of the memory array 1202 can be arranged in blocks, such as first and second blocks 1202A, 1202B. Each block can include sub-blocks. For example, the first block 1202A can include first and second sub-blocks 1202A$_0$, 1202A$_n$, and the second block 1202B can include first and second sub-blocks 1202B$_0$, 1202B$_n$. Each sub-block can include a number of physical pages, each page including a number of memory cells 1204. Although illustrated herein as having two blocks, each block having two sub-blocks, and each sub-block having a number of memory cells 1204, in other examples, the memory array 1202 can include more or fewer blocks, sub-blocks, memory cells, etc. In other examples, the memory cells 1204 can be arranged in a number of rows, columns, pages, sub-blocks, blocks, etc., and accessed using, for example, access lines 1206, first data lines 1210, or one or more select gates, source lines, etc.

The memory control unit 1230 can control memory operations of the memory device 1200 according to one or more signals or instructions received on control lines 1232, including, for example, one or more dock signals or control signals that indicate a desired operation (e.g., write, read, erase), or address signals (A0-AX) received on one or more address lines 1216. One or more devices external to the memory device 1200 can control the values of the control signals on the control lines 1232, or the address signals on the address line 1216. Examples of devices external to the memory device 1200 can include, but are not limited to, a host, a memory controller, a processor, or one or more circuits or components not illustrated in FIG. 12.

The memory device 1200 can use access lines 1206 and first data lines 1210 to transfer data to (e.g., write or erase) or from (e.g., read) one or more of the memory cells 1204. The row decoder 1212 and the column decoder 1214 can receive and decode the address signals (A0-AX) from the address line 1216, can determine which of the memory cells 1204 are to be accessed, and can provide signals to one or more of the access lines 1206 (e.g., one or more of a plurality of word lines (WL0-WLm)) or the first data lines 1210 (e.g., one or more of a plurality of bit lines (BL0-BLn)), such as described above.

The memory device 1200 can include sense circuitry, such as the sense amplifiers 1220, configured to determine the values of data on (e.g., read), or to determine the values of data to be written to, the memory cells 1204 using the first data lines 1210. For example, in a selected string of memory cells 1204, one or more of the sense amplifiers 1220 can read a logic level in the selected memory cell 1204 in response to a read current flowing in the memory array 1202 through the selected string to the data lines 1210.

One or more devices external to the memory device 1200 can communicate with the memory device 1200 using the I/O lines (DQ0-DQN) 1208, address lines 1216 (A0-AX), or control lines 1232. The input/output (I/O) circuit 1226 can transfer values of data in or out of the memory device 1200, such as in or out of the page buffer 1222 or the memory array 1202, using the I/O lines 1208, according to, for example, the control lines 1232 and address lines 1216. The page buffer 1222 can store data received from the one or more devices external to the memory device 1200 before the data is programmed into relevant portions of the memory array 1202, or can store data read from the memory array 1202 before the data is transmitted to the one or more devices external to the memory device 1200.

The column decoder 1214 can receive and decode address signals (A0-AX) into one or more column select signals (CSEL1-CSELn). The selector 1224 (e.g., a select circuit) can receive the column select signals (CSEL1-CSELn) and select data in the page buffer 1222 representing values of data to be read from or to be programmed into memory cells 1204. Selected data can be transferred between the page buffer 1222 and the I/O circuit 1226 using second data lines 1218.

The memory control unit 1230 can receive positive and negative supply signals, such as a supply voltage (Vcc) 1234 and a negative supply (Vss) 1236 (e.g., a ground potential), from an external source or supply (e.g., an internal or external battery, an AC-to-DC converter, etc.). In certain examples, the memory control unit 1230 can include a regulator 1228 to internally provide positive or negative supply signals.

Figure 13:
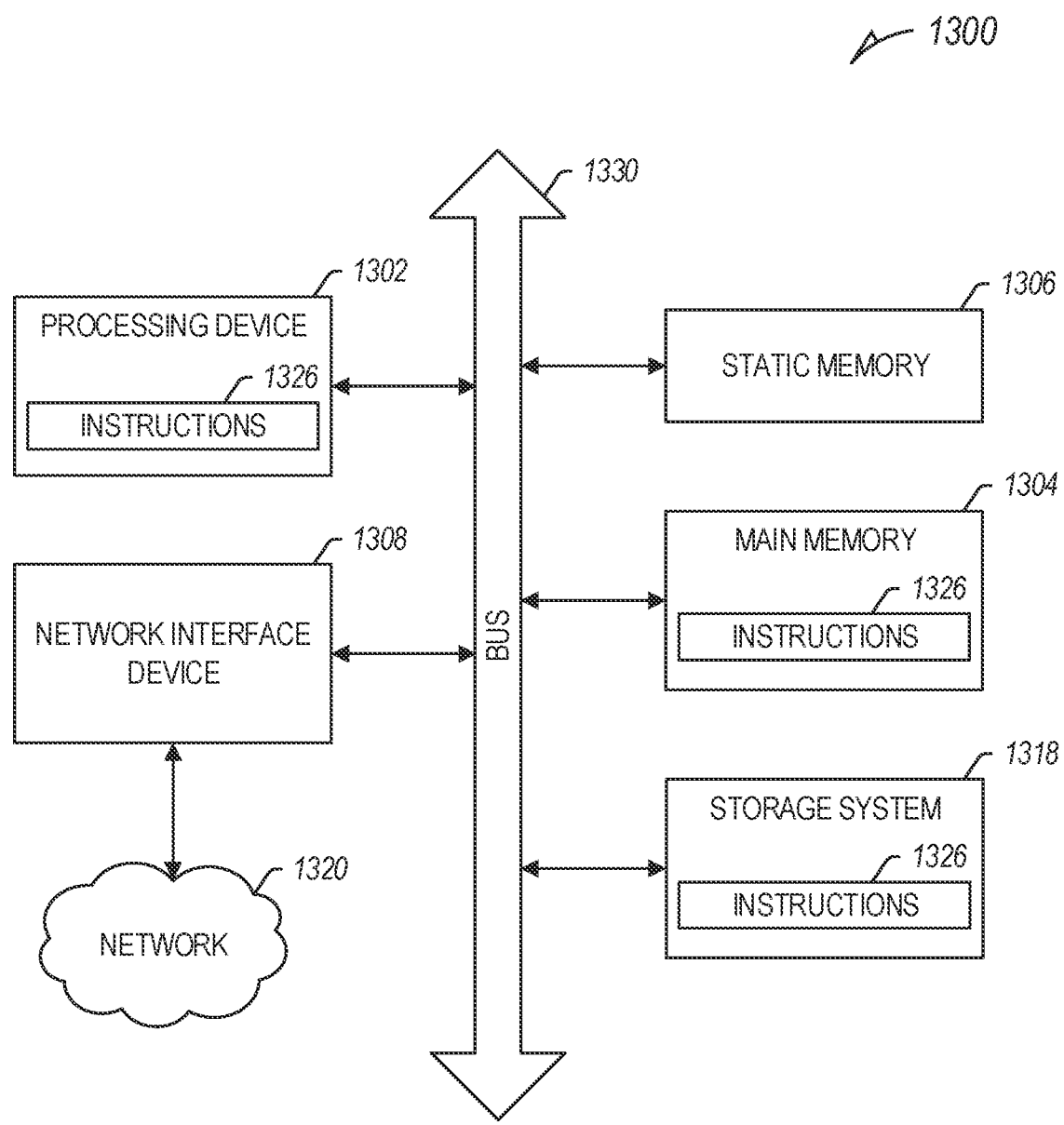
FIG. 13 illustrates an example block diagram of an information handling system.

FIG. 13 illustrates a block diagram of an example machine (e.g., a host system) 1300 upon which any one or more of the techniques (e.g., methodologies) discussed herein may perform. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system, a host system, etc.) 1300 may include a processing device 1302 (e.g., a hardware processor, a central processing unit (CPU), a graphics processing unit (GPU), a hardware processor core, or any combination thereof, etc.), a main memory 1304 (e.g., read-only memory (ROM), dynamic random-access memory (DRAM) such as synchronous DRAM (SDRAM) or Rambus DRAM (RDRAM), etc.), a static memory 1306 (e.g., static random-access memory (SRAM), etc.), and a storage system 1318, some or all of which may communicate with each other via a communication interface (e.g., a bus) 1330.

The processing device 1302 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 1302 can also be one or more special-purpose processing devices such as an application specific integrated circuit (ASIC), a field programmable gate array (FPGA), a digital signal processor (DSP), network processor, or the like. The processing device 1302 can be configured to execute instructions 1326 for performing the operations and steps discussed herein. The computer system 1300 can further include a network interface device 1308 to communicate over a network 1320.

The storage system 1318 can include a machine-readable storage medium (also known as a computer-readable medium) on which is stored one or more sets of instructions 1326 or software embodying any one or more of the methodologies or functions described herein. The instructions 1326 can also reside, completely or at least partially, within the main memory 1304 or within the processing device 1302 during execution thereof by the computer system 1300, the main memory 1304 and the processing device 1302 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EPROM)) and flash memory devices; magnetic disks, such as internal hard disks and removable disks; magneto-optical disks; and CD-ROM and DVD-ROM disks.

The machine 1300 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 1300 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 1326 (e.g., software, programs, an operating system (OS), etc.) or other data are stored on the storage system 1318 can be accessed by the main memory 1304 for use by the processing device 1302. The main memory 1304 (e.g., DRAM) is typically fast, but volatile, and thus a different type of storage than the storage system 1318 (e.g., an SSD), which is suitable for long-term storage, including while in an "off" condition. The instructions 1326 or data in use by a user or the machine 1300 are typically loaded in the main memory 1304 for use by the processing device 1302. When the main memory 1304 is full, virtual space from the storage system 1318 can be allocated to supplement the main memory 1304; however, because the storage system 1318 device is typically slower than the main memory 1304, and write speeds are typically at least twice as slow as read speeds, use of virtual memory can greatly reduce user experience due to storage system latency (in contrast to the main memory 1304, e.g., DRAM). Further, use of the storage system 1318 for virtual memory can greatly reduce the usable lifespan of the storage system 1318.

The instructions 1324 may further be transmitted or received over a network 1320 using a transmission medium via the network interface device 1308 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1308 may include one or more physical jacks (e.g., Ethernet, coaxial, or phone jacks) or one or more antennas to connect to the network 1320. In an example, the network interface device 1308 may include a plurality of antennas to wirelessly communicate using at least one of single-input multiple-output (SIMO), multiple-input multiple-output (MIME), or multiple-input single-output (MISO) techniques. The term "transmission medium" shad be taken to include any intangible medium that is capable of storing, encoding, or carrying instructions for execution by the machine 1300, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a select gate source (SGS), a control gate (CG), and a select gate drain (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (i.e., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

In Example 1, subject matter (e.g., a storage system) may comprise: a group of multi-level memory cells, each multi-level memory cell comprising multiple pages; and control circuitry configured to: receive an indication to selectively overwrite first data stored on a first page of a first subset of the group of multi-level memory cells; determine, in response the indication to selectively overwrite the first data, a second subset of memory cells from the first subset that, in response to programming from a first level to a second level, will alter a read output of the first data on the first page and maintain a read output of the remaining of the multiple pages; and program the second subset of memory cells from the first level to the second level to securely remove the first data stored on the first page while maintaining data on the remaining of the multiple pages.

In Example 2, the subject matter of Example 1 may optionally be configured such that: the group of multi-level memory cells comprises a group of triple-level memory cells, each triple-level memory cell defining three pages and eight levels, wherein the three pages comprise a lower page, an upper page, and an extra page, and wherein the eight levels include level 0 (L0) through level 7 (L7); and the second level is a successive level to the first level.

In Example 3, the subject matter of any one or more of Examples 1-2 may optionally be configured such that: the first page is the lower page and the remaining of the multiple pages include the upper page and the extra page; to determine the second subset of memory cells for first data stored on the lower page of the first subset of memory cells, the control circuitry is configured to identify memory cells from the first subset of memory cells programmed to level 3 (L3); and, to program the second subset of memory cells, the control circuitry is configured to program the identified memory cells from the first subset of memory cells programmed to L3 to level 4 (L4).

In Example 4, the subject matter of any one or more of Examples 1-3 may optionally be configured such that: each triple-level memory cell comprises seven read levels, including read level 3 (RL3) between level 2 (L2) and L3 and read level 4 (RL4) between L3 and L4; to identify memory cells from the first subset of memory cells programmed to L3, the control circuit is configured to read memory cells from the first subset of memory cells at RL3 in a first read operation, read memory cells from the first subset of memory cells at RL4 in a second read operation, and perform an exclusive OR (XOR) data operation on the results of the first and second read operations; and the control circuitry is configured to determine the second subset of memory cells using the results of the XOR data operation.

In Example 5, the subject matter of any one or more of Examples 1-4 may optionally be configured such that the first page is the upper page and the remaining of the multiple pages include the lower page and the extra page; to determine the second subset of memory cells for first data stored on the upper page of the first subset of memory cells, the control circuitry is configured to identify memory cells from the first subset of memory cells programmed to level 1 (L1); and, to program the second subset of memory cells, the control circuitry is configured to program the identified memory cells from the first subset of memory cells programmed to L1 to level 2 (L2).

In Example 6, the subject matter of any one or more of Examples 1-5 may optionally be configured such that each triple-level memory cell comprises seven read levels, including read level 1 (RL1) between L0 and L1 and read level 2 (RL2) between L1 and L2; to identify memory cells from the first subset of memory cells programmed to L1, the control circuit is configured to read memory cells from the first subset of memory cells at RL1 in a first read operation, read memory cells from the first subset of memory cells at RL2 in a second read operation, and perform an exclusive OR (XOR) data operation on the results of the first and second read operations; and the control circuitry is configured to determine the second subset of memory cells using the results of the XOR data operation.

In Example 7, the subject matter of any one or more of Examples 1-6 may optionally be configured such that: the first page is the extra page and the remaining of the multiple pages include the lower page and the upper page; to determine the second subset of memory cells for first data stored on the extra page of the first subset of memory cells, the control circuitry is configured to identify memory cells from the first subset of memory cells programmed to L0; and, to program the second subset of memory cells, the control circuitry is configured to program the identified memory cells from the first subset of memory cells programmed to L0 to level 1 (L1).

In Example 8, the subject matter of any one or more of Examples 1-7 may optionally be configured such that: each triple-level memory cell comprises seven read levels, including read level 1 (RL1) between L0 and L1; to identify memory cells from the first subset of memory cells programmed to L0, the control circuit is configured to read memory cells from the first subset of memory cells at RL1 in a first read operation; and the control circuitry is configured to determine the second subset of memory cells using the results of the first read operation.

In Example 9, the subject matter of any one or more of Examples 1-8 may optionally be configured such that: the group of multi-level memory cells comprises a group of two-level memory cells, each two-level memory cell defining two pages and four levels, wherein the two pages comprise a lower page and an upper page, and wherein the four levels include level 0 (L0) through level 3 (L3); and the second level is a successive level to the first level.

In Example 10, the subject matter of any one or more of Examples 1-9 may optionally be configured such that: the first page is the lower page and the remaining of the multiple pages includes the upper page; to determine the second subset of memory cells for first data stored on the lower page of the first subset of memory cells, the control circuitry is configured to identify memory cells from the first subset of memory cells programmed to level 1 (L1); and, to program the second subset of memory cells, the control circuitry is configured to program the identified memory cells from the first subset of memory cells programmed toll to level 2 (L2).

In Example 11, the subject matter of any one or more of Examples 1-10 may optionally be configured such that: each two-level memory cell comprises three read levels, including read level 1 (RL1) between L0 and L1 and read level 2 (RL2) between L1 and L2; to identify memory cells from the first subset of memory cells programmed toll, the control circuit is configured to read memory cells from the first subset of memory cells at RL2 in a first read operation, read memory cells from the first subset of memory cells at RL1 in a second read operation, and perform an exclusive OR (XOR) data operation on the results of the first and second read operations; and the control circuitry is configured to determine the second subset of memory cells using the results of the XOR data operation.

In Example 12, the subject matter of any one or more of Examples 1-11 may optionally be configured such that: the first page is the upper page and the remaining of the multiple pages includes the lower page; to determine the second subset of memory cells for first data stored on the upper page of the first subset of memory cells, the control circuitry is configured to identify memory cells from the first subset of memory cells programmed to L0; and, to program the second subset of memory cells, the control circuitry is configured to program the identified memory cells from the first subset of memory cells programmed to L0 to level 1 (L1).

In Example 13, the subject matter of any one or more of Examples 1-12 may optionally be configured such that: each two-level memory cell comprises three read levels, including read level 1 (RL1) between L0 and L1; to identify memory cells from the first subset of memory cells programmed to L0, the control circuit is configured to read memory cells from the first subset of memory cells at RL1 in a first read operation; and the control circuitry is configured to determine the second subset of memory cells using the results of the first read operation.

In Example 14, the subject matter of any one or more of Examples 1-13 may optionally be configured such that: the group of multi-level memory cells comprises a group of quad-level memory cells, each quad-level memory cell defining four pages and sixteen levels, wherein the four pages comprise a lower page, an upper page, an extra page, and a top page, and wherein the sixteen levels include level 0 (L0) through level 15 (L15); the first page is one of the four pages and the remaining of the multiple pages include the remaining three of the four pages; and the second level is a successive level to the first level.

In Example 15, the subject matter of any one or more of Examples 1-14 may optionally be configured such that the control circuitry is configured to, in response to moving the first data from a first location to a second location on the storage system, provide the indication to securely remove the first data stored at the first location.

In Example 16, the subject matter of any one or more of Examples 1-15 may optionally be configured such that the control circuitry is configured to, in response the indication to selectively overwrite the first data, provide at least one soft erase pulse to the first data stored on the first page to induce distribution overlaps.

In Example 17, the subject matter of any one or more of Examples 1-16 may optionally be configured to comprise: a host device comprising a host processor and a group of volatile memory cells; a host interface configured to enable communication between the storage system and the host device; a memory controller; and a memory device comprising a device controller the group of multi-level memory cells, wherein the group of multi-level memory cells includes a group of multi-level, non-volatile memory cells, wherein the control circuitry includes at least one of the memory controller or the device controller, and the multiple levels of each mufti-level memory cell define the multiple pages of each multi-level memory cell.

In Example 18, subject matter (e.g., a method) may comprise: receiving, at control circuitry of a storage system, an indication to selectively overwrite first data stored on a first page of a first subset of a group of multi-level memory cells of the storage system, each multi-level memory cell comprising multiple pages; determining, using the control circuitry, in response the indication to selectively overwrite the first data, a second subset of memory cells from the first subset that, in response to programming from a first level to a second level, will alter a read output of the first data on the first page and maintain a read output of the remaining of the multiple pages; and programming the second subset of memory cells from the first level to the second level to securely remove the first data stored on the first page while maintaining data on the remaining of the multiple pages.

In Example 19, the subject matter of Example 18 may optionally be configured such that: the group of multi-level memory cells comprises a group of triple-level memory cells, each triple-level memory cell defining three pages and eight levels, wherein the three pages comprise a lower page, an upper page, and an extra page, and wherein the eight levels include level 0 (L0) through level 7 (L7); the first page is one of the three pages and the remaining of the multiple pages include the remaining two of the three pages; and the second level is a successive level to the first level.

In Example 20, the subject matter of any one or more of Examples 18-19 may optionally be configured such that: the group of multi-level memory cells comprises a group of two-level memory cells, each two-level memory cell defining two pages and four levels, wherein the two pages comprise a lower page and an upper page, and wherein the four levels include level 0 (L0) through level 3 (L3); the first page is one of the two pages and the remaining of the multiple pages includes the other of the two pages; and the second level is a successive level to the first level.

In Example 21, the subject matter of any one or more of Examples 18-20 may optionally be configured such that the group of multi-level memory cells comprises a group of quad-level memory cells, each quad-level memory cell defining four pages and sixteen levels, wherein the four pages comprise a lower page, an upper page, an extra page, and a top page, and wherein the sixteen levels include level 0 (L0) through level 15 (L15); the first page is one of the four pages and the remaining of the multiple pages include the remaining three of the four pages; and the second level is a successive level to the first level.

In Example 22, subject matter (e.g., at least one non-transitory storage medium) may comprise instructions that, when executed by control circuitry of a storage system, cause the storage system to perform operations comprising: receive an indication to selectively overwrite first data stored on a first page of a first subset of a group of multi-level memory cells of the storage system, each multi-level memory cell comprising multiple pages; determine, in response the indication to selectively overwrite the first data, a second subset of memory cells from the first subset that, in response to programming from a first level to a second level, will alter a read output of the first data on the first page and maintain a read output of the remaining of the multiple pages; and program the second subset of memory cells from the first level to the second level to securely remove the first data stored on the first page while maintaining data on the remaining of the multiple pages.

In Example 23, the subject matter of Example 22 may optionally be configured such that: the group of multi-level memory cells comprises a group of triple-level memory cells, each triple-level memory cell defining three pages and eight levels, wherein the three pages comprise a lower page, an upper page, and an extra page, and wherein the eight levels include level 0 (L0) through level 7 (L7); the first page is one of the three pages and the remaining of the multiple pages include the remaining two of the three pages; and the second level is a successive level to the first level.

In Example 24, the subject matter of any one or more of Examples 22-23 may optionally be configured such that: the group of multi-level memory cells comprises a group of two-level memory cells, each two-level memory cell defining two pages and four levels, wherein the two pages comprise a lower page and an upper page, and wherein the four levels include level 0 (L0) through level 3 (L3); the first page is one of the two pages and the remaining of the multiple pages includes the other of the two pages; and the second level is a successive level to the first level.

In Example 25, the subject matter of any one or more of Examples 22-24 may optionally be configured such that: the group of multi-level memory cells comprises a group of quad-level memory cells, each quad-level memory cell defining four pages and sixteen levels, wherein the four pages comprise a lower page, an upper page, an extra page, and a top page, and wherein the sixteen levels include level 0 (L0) through level 15 (L15); the first page is one of the four pages and the remaining of the multiple pages include the remaining three of the four pages; and the second level is a successive level to the first level.

In Example 26, subject matter (e.g., a system or apparatus) may optionally combine any portion or combination of any portion of any one or more of Examples 1-25 to comprise "means for" performing any portion of any one or more of the functions or methods of Examples 1-25, or at least one "non-transitory machine-readable medium" including instructions that, when performed by a machine, cause the machine to perform any portion of any one or more of the functions or methods of Examples 1-25.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A storage system comprising:
a group of multi-level memory cells, each multi-level memory cell comprising multiple pages; and
control circuitry configured to:
receive an indication to selectively erase first data stored on a first page of a first subset of the group of multi-level memory cells, each multi-level memory cell of the first subset of the group of multi-level memory cells comprising the first page and a second page configured to store second data separate from the first data stored on the first page; and
in response to the received indication to selectively erase the first data stored on the first page of the first subset of the group of multi-level memory cells, provide at least one soft erase pulse to the first page of memory cells associated with the first data to induce distribution overlap across different bit levels of the first page of the group of multi-level memory cells to alter a read output of the first data on the first page of memory cells while maintaining a read output of the remaining of the multiple pages of the first subset of the group of multi-level memory cells.

2. The storage system of claim 1,
wherein the control circuitry is configured to:
determine, in response the indication to selectively erase the first data, a second subset of memory cells from the first subset that, in response to at least one soft erase pulse, alter a read output of the first data on the first page and maintain a read output of the remaining of the multiple pages,
wherein, to provide the at least one soft erase pulse comprises to provide the at least one soft erase pulse to the second subset of memory cells to alter the first data stored on the first page while maintaining data on the remaining of the multiple pages.

3. The storage system of claim 2,
wherein to provide the at least one soft erase pulse comprises to provide multiple soft erase pulses, and
wherein to alter the read output of the first data comprises to reduce readability of the first data on the first page.

4. The storage system of claim 2,
wherein the group of multi-level memory cells comprises a group of triple-level memory cells, each triple-level memory cell defining three pages and eight levels, wherein the three pages comprise a lower page, an upper page, and an extra page, and wherein the eight levels include level 0 (L0) through level 7 (L7), and
wherein the second level is a successive level to the first level.

5. The storage system of claim 4,
wherein the first page is the lower page and the remaining of the multiple pages include the upper page and the extra page,
wherein, to determine the second subset of memory cells for first data stored on the lower page of the first subset of memory cells, the control circuitry is configured to:
identify memory cells from the first subset of memory cells programmed to level 3 (L3), and
wherein, to provide the at least one soft erase pulse to the second subset of memory cells, the control circuitry is configured to:
provide the at least one soft erase pulse to the identified memory cells from the first subset of memory cells programmed to L3.

6. The storage system of claim 5,
wherein each triple-level memory cell comprises seven read levels, including:
read level 3 (RL3) between level 2 (L2) and L3; and
read level 4 (RL4) between L3 and L4,
wherein, to identify memory cells from the first subset of memory cells programmed to L3, the control circuit is configured to:
read memory cells from the first subset of memory cells at RL3 in a first read operation;
read memory cells from the first subset of memory cells at RL4 in a second read operation; and
perform an exclusive OR (XOR) data operation on the results of the first and second read operations, and
wherein the control circuitry is configured to determine the second subset of memory cells using the results of the XOR data operation.

7. The storage system of claim 4,
wherein the first page is the upper page and the remaining of the multiple pages include the lower page and the extra page,
wherein, to determine the second subset of memory cells for first data stored on the upper page of the first subset of memory cells, the control circuitry is configured to:
identify memory cells from the first subset of memory cells programmed to level 1 (L1), and
wherein, to provide the at least one soft erase pulse to the second subset of memory cells, the control circuitry is configured to:
provide the at least one soft erase pulse to the identified memory cells from the first subset of memory cells programmed to L1.

8. The storage system of claim 7,
wherein each triple-level memory cell comprises seven read levels, including:
read level 1 (RL1) between L0 and L1; and
read level 2 (RL2) between L1 and L2,
wherein, to identify memory cells from the first subset of memory cells programmed to L1, the control circuit is configured to:
read memory cells from the first subset of memory cells at RL1 in a first read operation;
read memory cells from the first subset of memory cells at RL2 in a second read operation; and
perform an exclusive OR (XOR) data operation on the results of the first and second read operations, and
wherein the control circuitry is configured to determine the second subset of memory cells using the results of the XOR data operation.

9. The storage system of claim 4,
wherein the first page is the extra page and the remaining of the multiple pages include the lower page and the upper page,
wherein, to determine the second subset of memory cells for first data stored on the extra page of the first subset of memory cells, the control circuitry is configured to:
identify memory cells from the first subset of memory cells programmed to L0, and
wherein, to provide the at least one soft erase pulse to the second subset of memory cells, the control circuitry is configured to:
provide the at least one soft erase pulse to the identified memory cells from the first subset of memory cells programmed to L0.

10. The storage system of claim 9,
wherein each triple-level memory cell comprises seven read levels, including read level 1 (RL1) between L0 and L1,
wherein, to identify memory cells from the first subset of memory cells programmed to L0, the control circuit is configured to:
read memory cells from the first subset of memory cells at RL1 in a first read operation, and
wherein the control circuitry is configured to determine the second subset of memory cells using the results of the first read operation.

11. The storage system of claim 2,
wherein the group of multi-level memory cells comprises a group of two-level memory cells, each two-level memory cell defining two pages and four levels, wherein the two pages comprise a lower page and an upper page, and wherein the four levels include level 0 (L0) through level 3 (L3), and
wherein the second level is a successive level to the first level.

12. The storage system of claim 11,
wherein the first page is the lower page and the remaining of the multiple pages includes the upper page,
wherein, to determine the second subset of memory cells for first data stored on the lower page of the first subset of memory cells, the control circuitry is configured to:
identify memory cells from the first subset of memory cells programmed to level 1 (L1), and
wherein, to provide the at least one soft erase pulse to the second subset of memory cells, the control circuitry is configured to:
provide the at least one soft erase pulse to the identified memory cells from the first subset of memory cells programmed to L1.

13. The storage system of claim 12,
wherein each two-level memory cell comprises three read levels, including:
read level 1 (RL1) between L0 and L1; and
read level 2 (RL2) between L1 and L2,
wherein, to identify memory cells from the first subset of memory cells programmed to L1, the control circuit is configured to:
read memory cells from the first subset of memory cells at RL2 in a first read operation;
read memory cells from the first subset of memory cells at RL1 in a second read operation; and
perform an exclusive OR (XOR) data operation on the results of the first and second read operations, and
wherein the control circuitry is configured to determine the second subset of memory cells using the results of the XOR data operation.

14. The storage system of claim 11,
wherein the first page is the upper page and the remaining of the multiple pages includes the lower page,
wherein, to determine the second subset of memory cells for first data stored on the upper page of the first subset of memory cells, the control circuitry is configured to:
identify memory cells from the first subset of memory cells programmed to L0, and
wherein, to provide the at least one soft erase pulse to the second subset of memory cells, the control circuitry is configured to:
provide the at least one soft erase pulse to the identified memory cells from the first subset of memory cells programmed to L0.

15. The storage system of claim 14,
wherein each two-level memory cell comprises three read levels, including read level 1 (RL1) between L0 and L1,
wherein, to identify memory cells from the first subset of memory cells programmed to L0, the control circuit is configured to:
read memory cells from the first subset of memory cells at RL1 in a first read operation, and
wherein the control circuitry is configured to determine the second subset of memory cells using the results of the first read operation.

16. The storage system of claim 2,
wherein the group of multi-level memory cells comprises a group of quad-level memory cells, each quad-level memory cell defining four pages and sixteen levels, wherein the four pages comprise a lower page, an upper page, an extra page, and a top page, and wherein the sixteen levels include level 0 (L0) through level 15 (L15),
wherein the first page is one of the four pages and the remaining of the multiple pages include the remaining three of the four pages, and
wherein the second level is a successive level to the first level.

17. The storage system of claim 1, wherein each page of the multi-level memory cell comprises eight levels, the eight levels including level 0 (L0), level 1 (L1), level 2 (L2), level 3 (L3), level 4 (L4), level 5 (L5), level 6 (L6), and level 7 (L7).

18. The storage system of claim 1, wherein, to provide the at least one soft erase pulse comprises to provide the at least one soft erase pulse to a second subset of memory cells of the first subset to alter the first data stored on the first page while maintaining data on the remaining of the multiple pages.

19. A method comprising:
receiving, at control circuitry of a storage system, an indication to selectively erase first data stored on a first page of a first subset of a group of multi-level memory cells of the storage system, each multi-level memory cell of the first subset of the group of multi-level memory cells comprising the first page and a second page configured to store second data separate from the first data stored on the first page; and
providing, in response the received indication to selectively erase the first data stored on the first page of the first subset of the group of multi-level memory cells, using the control circuitry, at least one soft erase pulse to the first page of memory cells associated with the first data to induce distribution overlap across different bit levels of the first page of the group of multi-level memory cells to alter a read output of the first data on the first page of memory cells while maintaining a read output of the remaining of the multiple pages of the first subset of the group of multi-level memory cells.

20. The method of claim 19, comprising:
determining, in response the indication to selectively erase the first data, a second subset of memory cells from the first subset that, in response to at least one soft erase pulse, alter a read output of the first data on the first page and maintain a read output of the remaining of the multiple pages,
wherein providing the at least one soft erase pulse comprises providing the at least one soft erase pulse to the second subset of memory cells to alter the first data stored on the first page while maintaining data on the remaining of the multiple pages.

21. The method of claim 20,
wherein providing the at least one soft erase pulse comprises providing multiple soft erase pulses, and
wherein to alter the read output of the first data comprises to reduce readability of the first data on the first page.

22. A storage system comprising:
a group of multi-level memory cells, each multi-level memory cell comprising multiple pages; and
control circuitry configured to:
receive an indication to selectively erase first data stored on a first page of a first subset of the group of multi-level memory cells; and
in response to the received indication to selectively erase the first data, provide at least one soft erase pulse to a second subset of the first subset of memory cells associated with the first data to alter the first data stored on the first page while maintaining data on the remaining of the multiple pages of the first subset of the group of multi-level memory cells.

23. The storage system of claim 22, wherein the control circuitry is configured to:
- determine, in response the indication to selectively erase the first data, the second subset of memory cells from the first subset that, in response to at least one soft erase pulse, alter a read output of the first data on the first page and maintain a read output of the remaining of the multiple pages,
- wherein, to provide the at least one soft erase pulse comprises to provide the at least one soft erase pulse to the second subset of memory cells to alter the first data stored on the first page while maintaining data on the remaining of the multiple pages.

* * * * *